United States Patent
Avila et al.

(10) Patent No.: US 11,412,374 B2
(45) Date of Patent: *Aug. 9, 2022

(54) AIRCRAFT INTERFACE DEVICE

(71) Applicant: The Boeing Company, Chicago, IL (US)

(72) Inventors: Steven J. Avila, Renton, WA (US); Antonio Sanchez, Bothell, WA (US); John P. Baron, Bothell, WA (US); Daniel J. Ellis, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/008,488

(22) Filed: Aug. 31, 2020

(65) Prior Publication Data

US 2020/0396602 A1    Dec. 17, 2020

Related U.S. Application Data

(63) Continuation-in-part of application No. 15/717,731, filed on Sep. 27, 2017, now Pat. No. 10,764,753.

(51) Int. Cl.
*H04W 12/033* (2021.01)
*G06F 13/40* (2006.01)
(Continued)

(52) U.S. Cl.
CPC .......... *H04W 12/033* (2021.01); *B64D 43/00* (2013.01); *G06F 1/266* (2013.01); *G06F 1/28* (2013.01);
(Continued)

(58) Field of Classification Search
CPC ... H02J 7/00; B64C 3/56; G01C 23/00; B64D 45/00; B64D 47/00; B64D 43/00;
(Continued)

(56) References Cited

U.S. PATENT DOCUMENTS

| 5,123,112 A | 6/1992 | Choate |
| 7,338,010 B2 * | 3/2008 | Corder ...................... B64C 3/56 |
| | | 244/3.24 |

(Continued)

FOREIGN PATENT DOCUMENTS

| EP | 2945244 | 11/2015 |
| EP | 3154151 | 4/2017 |

OTHER PUBLICATIONS

"Aerospace—Connectivity & Data Management", Astronautics Corporation of America, 3 pages [online], [retrieved on Jun. 30, 2017], Retrieved from the Internet <URL:http://astronautics.com/technology/aerospace/>.

(Continued)

*Primary Examiner* — Thanhnga B Truong
(74) *Attorney, Agent, or Firm* — Haynes and Boone, LLP

(57) ABSTRACT

An aircraft interface device comprising two or more data interface devices, an external data transceiver, a power module, a domain switch, and a controller is disclosed. The two or more data interface devices communicate data, the external data transceiver communicate to an external communication device, and the power module provides power to the two or more data interface devices and the external data transceiver. The two or more data interface devices comprise a first data interface device that communicates with avionics equipment when the first data interface device is powered and a second data interface device that communicates with non-avionics equipment when the second data interface device is powered. The domain switch selectively provides power from the power module to at least one of the two or more data interface devices. The controller provides a data communication path between the selectively powered data interface device and the external data transceiver for the external communication device.

21 Claims, 7 Drawing Sheets

(51) Int. Cl.

| | | |
|---|---|---|
| *G06F 1/26* | (2006.01) | |
| *G06F 1/28* | (2006.01) | |
| *H04L 9/08* | (2006.01) | |
| *B64D 43/00* | (2006.01) | |
| *H04W 12/72* | (2021.01) | |
| *H04W 12/088* | (2021.01) | |
| *H04W 8/18* | (2009.01) | |
| *H04L 12/46* | (2006.01) | |
| *H04W 88/06* | (2009.01) | |

(52) U.S. Cl.
CPC ........ *G06F 13/4022* (2013.01); *H04L 9/0877* (2013.01); *H04W 12/088* (2021.01); *H04W 12/72* (2021.01); *B64D 2221/00* (2013.01); *H04L 12/4641* (2013.01); *H04W 8/18* (2013.01); *H04W 88/06* (2013.01)

(58) Field of Classification Search
CPC .... H04B 7/00; H04N 7/18; G06F 1/26; G06F 1/28; G06F 13/40; G06F 13/4022; G06F 1/266; H04W 12/00; H04W 12/08; H04W 12/088; H04W 12/72; H04W 12/033; H04L 9/08; H04L 9/0877; H04L 63/0209; H04L 9/0897; H04L 9/0662; H04L 12/4625

See application file for complete search history.

(56) References Cited

U.S. PATENT DOCUMENTS

| | | | |
|---|---|---|---|
| 7,725,610 | B2 | 5/2010 | Hosokawa |
| 7,804,280 | B2 | 9/2010 | Deaver, Sr. et al. |
| 7,908,042 | B2 | 3/2011 | Brinkley et al. |
| 8,493,906 | B1 | 7/2013 | Troxel et al. |
| 8,649,785 | B2 | 2/2014 | Durand et al. |
| 8,672,258 | B1 * | 3/2014 | Tillotson ............... B64C 1/1484 244/1 R |
| 8,676,393 | B1 | 3/2014 | Hupton et al. |
| 8,957,791 | B2 * | 2/2015 | Macrae ................. G08C 17/00 340/971 |
| 9,334,063 | B2 * | 5/2016 | Baumgarten ...... G05B 23/0216 |
| 2006/0143661 | A1 * | 6/2006 | Funderburk ..... H04N 21/43615 725/76 |
| 2010/0105329 | A1 | 4/2010 | Durand et al. |
| 2016/0244180 | A1 * | 8/2016 | Baumgarten ...... G05B 23/0216 |

OTHER PUBLICATIONS

Products & Solutions, "Aircraft Interface Devices (AID)—Overview", Astronics Corporation, 2 pages [online], [retrieved on Jun. 30, 2017], Retrieved from the Internet <URL:https://www.astronics.com/oroduct?productgroup=Avionics%20intertace%20Solutions&subproduct=aircraft%20interface%20devices%20(aid)>.

GroundLink® AID +, "Maximize your Crew's Intelligence—Activate your cockpit connectivity and enhance your flight performance", Teledyne Controls Everywhereyoulook, 1 page [online], [retrieved on Jun. 30, 2017]. Retrieved from the Internet <URL:http://www.teledynecontrols.com/products/data-solutions/aidplus>.

GroundLink® AID +, "GroundLink AID+ enhances EFB systems functionality by connecting innovative apps with onboard data—Better Decisions", Teledyne Controls Everywhereyoulook, 1 page [online], [retrieved on Jun. 30, 2017], Retrieved from the Internet <URL:http://www.teledynecontrols.com/products/data-solutions/aidplus>.

"avRDC = AID + QAR + WiFi + 3G/4G + ADL The World's Lightest & Most Robust", avionica, 4 pages [online], [retrieved on Jun. 30, 2017], Retrieved from the Internet <URL:https://www.avionica.com/index.php/airborne-products/avrdc-aid>.

* cited by examiner

AIRCRAFT INTERFACE DEVICE

CLAIM OF PRIORITY

The present application is a continuation-in-part (CIP) of the U.S. patent application Ser. No. 15/717,731, titled "Flight Crew Connectivity Systems and Methods," filed on Sep. 27, 2017, which is herein incorporated by reference in its entirety.

BACKGROUND

1. Technical Field

The field of the present disclosure relates generally to aircraft systems, and more particularly, for example, to secure flight crew communication connectivity.

2. Prior Art

In the field of aircraft flight crew secure communication, there is an ongoing effort to improve flight crew access to multiple levels of network communication security within the aircraft flight deck. For example, different data domains on an aircraft require different levels of network access security and existing solutions that provide secure network access require complex, multiunit systems to meet network security demands. Thus, there is a need to provide improved access to multiple secure and unsecure data domains by the flight crew within an aircraft flight deck.

SUMMARY

An aircraft interface device (AID) is disclosed. The AID is configured for deployment on an aircraft and comprises two or more data interface devices, an external data transceiver, a power module, a domain switch, and a controller. The two or more data interface devices are configured to communicate data, the external data transceiver is configured to communicate to an external communication device, and the power module is configured to provide power to the two or more data interface devices and the external data transceiver. The two or more data interface devices comprise a first data interface device configured to communicate with avionics equipment when the first data interface device is powered and a second data interface device configured to communicate with non-avionics equipment when the second data interface device is powered. The domain switch is in signal communication between the power module and each of the two or more data interface devices and is configured to selectively provide power from the power module to at least one of the two or more data interface devices. The controller is in signal communication between the two or more data interface devices and the external data transceiver and is configured to provide a data communication path between the selectively powered data interface device and the external data transceiver for the external communication device. The data from the avionics equipment is physically isolated on the data communication path when the first data interface device is powered and the second data interface device is unpowered and the data from the non-avionics equipment is physically isolated on the data communication path when the second data interface device is powered and the first data interface device is unpowered.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is an aircraft interface device (AID) configured for deployment on an aircraft. The AID comprises two or more data interface devices, an external data transceiver, a power module, a domain switch, and a controller. The two or more data interface devices are configured to communicate data, the external data transceiver is configured to communicate to an external communication device, and the power module is configured to provide power to the two or more data interface devices and the external data transceiver. The two or more data interface devices comprise a first data interface device configured to communicate with avionics equipment when the first data interface device is powered and a second data interface device configured to communicate with non-avionics equipment when the second data interface device is powered. The domain switch is in signal communication between the power module and each of the two or more data interface devices and is configured to selectively provide power from the power module to at least one of the two or more data interface devices. The controller is in signal communication between the two or more data interface devices and the external data transceiver and is configured to provide a data communication path between the selectively powered data interface device and the external data transceiver for the external communication device. The data from the avionics equipment is physically isolated on the data communication path when the first data interface device is powered and the second data interface device is unpowered and the data from the non-avionics equipment is physically isolated on the data communication path when the second data interface device is powered and the first data interface device is unpowered.

Systems and methods are provided in accordance with one or more embodiments that provides for a flight crew personal electronic device with a secure wireless data communication connection to various data domains integrated within an aircraft. In this regard, a flight crew connectivity system such as the AID provides for the flight crew personal electronic device to seamlessly connect to various aircraft data domains with differing levels of network access security without compromising security level requirements.

Figure 1:
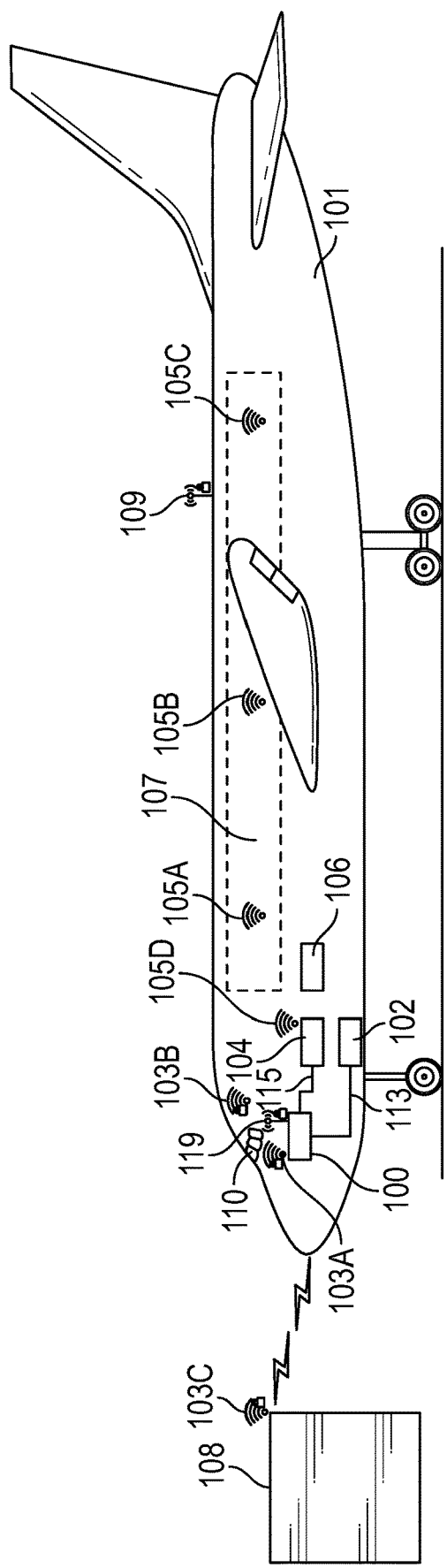
FIG. 1 illustrates a diagram of an aircraft including various aircraft data domains and network interfaces, along with a flight crew connectivity system, in accordance with one or more embodiments of the disclosure.

FIG. 1 is a system block diagram of an aircraft 101 including an aircraft interface device (AID) 100 (which is a type of, or a part of, a flight crew connectivity system), various aircraft data domains, multiple aircraft network interfaces, and aircraft equipment connected to the network interfaces in accordance with one or more embodiments of the disclosure. The AID 100 provides for a secure wireless data communication path between a flight deck 110 of aircraft 101 and various wired and wireless network protocols both onboard and outside of aircraft 101. For example, the AID 100 communicates with avionics equipment 102 onboard aircraft 101 through wired communication interface 113, preferably via a secure aircraft protocol data bus such as ARINC 429 or ARINC 717. In some embodiments, the AID 100 communicates with non-avionics equipment 104 through an Ethernet interface 115. In various embodiments, the AID 100 wirelessly and securely connects components of avionics equipment 102 and non-avionics equipment 104 with flight deck 110 via a secure wireless Wi-Fi network 103A-C. In some embodiments, wireless Wi-Fi network 103A-C is a dedicated and secure IEEE 802.11 service set identifier (SSID) airline proprietary login for flight crew personal electronic device use (e.g., such as flight crew personal electronic device 203, also known as external communication device, of FIG. 2) within flight deck 110. Aircraft 101 includes an aircraft power module 106 (e.g., power source) to provide power to the AID 100.

In some embodiments, the AID 100 is in wireless communication with ground electronics 108 to provide for secure wireless communications between ground electronics 108 and flight deck 110. In some embodiments, ground electronics 108 wirelessly interfaces to aircraft 101 through airline proprietary secure IEEE 802.11 wireless network connection 103C, however other wireless network interfaces are possible, such as an airline proprietary secure IEEE WiMAX 802.16 wireless network connection. Flight crew personnel may download predictive maintenance reports, and other data reports pertaining to aircraft 101 onto flight crew personal electronic device 203 from ground electronics 108, for example. In some embodiments, the AID 100 provides for a second secure wireless network 119 for secure communication between personal electronic device 203 and an external cellular device (e.g., such as external cellular device 237A of FIG. 2). The external communication device 203 may comprise one or more wireless smart devices configured to communicate with the wireless data transceiver 213 via the secure wireless communication network.

In various embodiments, avionics equipment 102 includes electronics for an aircraft information system and an aircraft control system. In some embodiments, electronics and circuitry for avionics equipment 102 is distributed throughout aircraft 101. In some embodiments, avionics equipment 102 provides for flight information and aircraft control data. In various embodiments, non-avionics equipment 104 includes electronics for passenger information systems and electronics and networks to interface to passenger personal electronic devices. In some embodiments, non-avionics equipment 104 provides for aircraft maintenance data, aircraft operational performance data and other less secure flight crew applications.

Aircraft 101 includes multiple connectivity protocols for connecting components of avionics equipment 102 and non-avionics equipment 104. In some embodiments, components of non-avionics equipment 104 utilize a Wi-Fi communication network 105A-D to provide passengers within aircraft cabin 107 with broadband internet access. Passengers wirelessly connect their personal electronic devices (e.g., smartphones, tablets, laptop computers, for example) to the broadband internet through a broadband Ku/Ka band SATCOM antenna 109. The AID 100 provides for a secure data link between Wi-Fi communication network 105A-D and flight deck 110 for flight crew personal electronic device 203 to access broadband internet without compromising high level security requirements of the aircraft 101 avionics equipment 102, as discussed herein.

Figure 2:
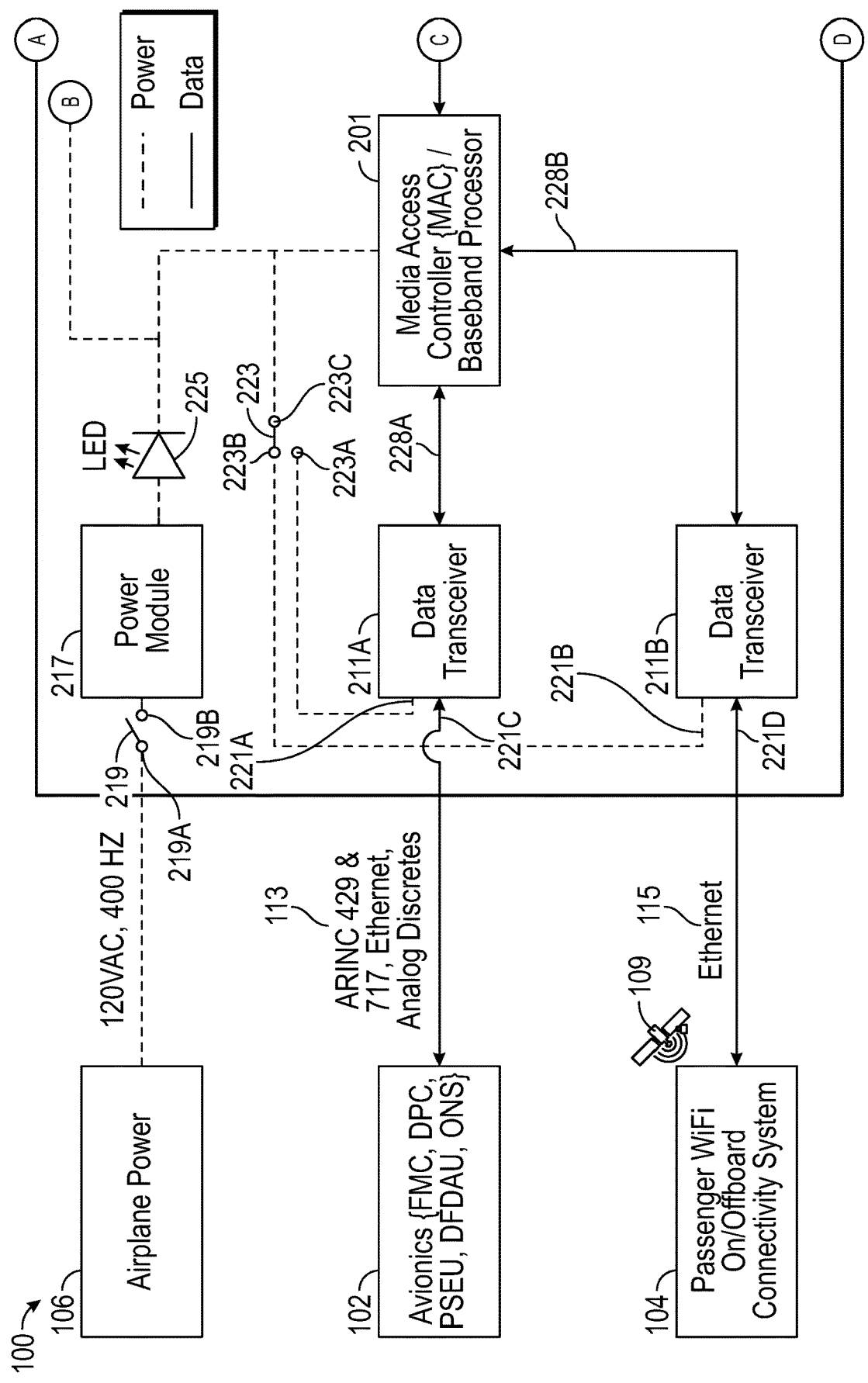
FIG. 2 illustrates a block diagram of a flight crew connectivity system in accordance with an embodiment of the disclosure.
Figure 2:
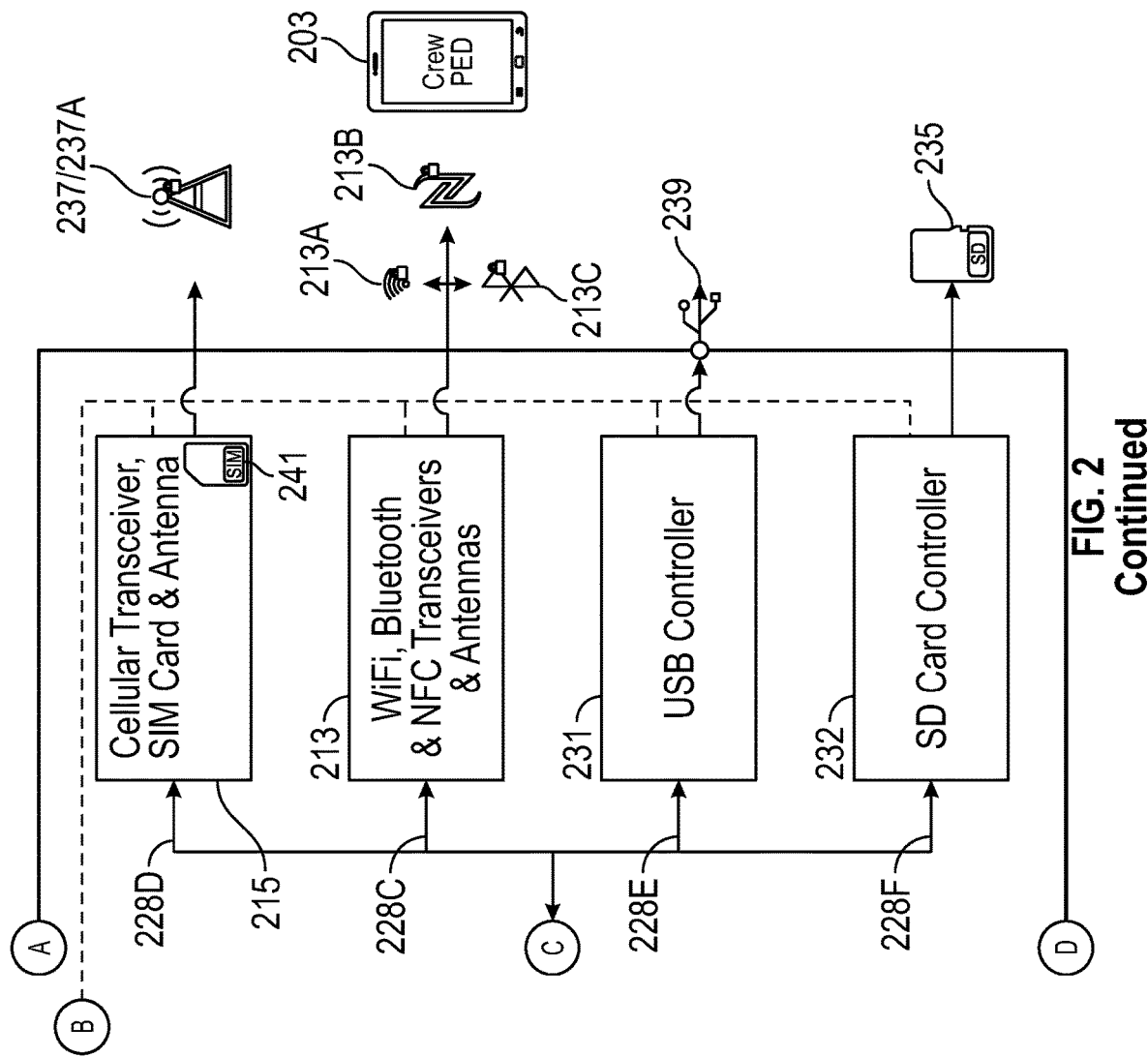

FIG. 2 illustrates a block diagram of the AID 100 in accordance with an embodiment of the disclosure. The AID 100 includes a controller 201 (e.g., a media access controller (MAC)/baseband processor), input data transceivers 211A-B (e.g., data interface devices), a wireless data transceiver 213 (e.g., a data transceiver, such as Wi-Fi data transceiver, Bluetooth data transceiver, near-field communication (NFC) data transceivers and antennas, Internet of Things (IoT) technology transceiver, where the IoT transceiver comprises an IoT protocol utilizing IEEE 802.15.4), a power module 217, and a domain switch 223. The wireless data transceiver 213 may also utilize a virtual private network (VPN) to communicate securely over the VPN to multiple cloud end points (i.e., communication end points). This VPN may be part of a multi-layered approach to security.

The AID 100 includes a power switch 219 (e.g., power source switch) connected to aircraft power module 106. In some embodiments, power switch 219 is implemented as a single-pole, single-throw power switch connected to aircraft power module 106 at a first terminal 219A and power module 217 at a second terminal 219B. In some embodiments, power switch 219 is manually controlled at a display panel (e.g., such as display panel 500 of FIG. 5) to provide 120 volts AC, 400 Hz to power module 217 connected to terminal 219B. However, in other embodiments, other aircraft power module 106 voltages and frequencies are possible. In other embodiments, power switch 219 is a solid-state switch electrically controlled by an electrical signal provided at display panel 500. In some embodiments, an indicator 225 is installed on display panel, and is implemented as a light emitting diode (LED). Indicator 225 is illuminated when power module 217 is powered on and providing power. In other embodiments, indicator 225 is implemented as an audible signal or other type of indicator to inform an operator that power module 217 is providing power. In some embodiments, power module 217 provides power directly to controller 201, wireless data transceiver 213, a cellular transceiver 215 (e.g., cellular transceiver, SIM card and antenna), a Universal Serial Bus (USB) controller 231, and a secure digital (SD) card controller 232.

In various embodiments, power module 217 provides power to domain switch 223. Domain switch 223 is implemented as a single-pole, double-throw switch where an input terminal 223C is connected to power module 217. A first output terminal 223A is connected to a first input data transceiver 211A (e.g., a first data interface device) at input connection 221A to provide power to first input data transceiver 211A. A second output terminal 223B is connected to a second input data transceiver 211B (e.g., a second data interface device) at input connection 221B to provide power to second input data transceiver 211B. In other embodiments, domain switch 223 includes fewer or more output terminals connected to fewer or more input data transceivers 211. In yet another embodiment, domain switch 223 is implemented as a solid-state switch controlled by electrical signals provided at display panel 500. The configuration of domain switch 223 (e.g., single-pole, double-throw) prevents first input data transceiver 211A and second input data transceiver 211B from being powered on at the same time in order to provide for a physical isolation of data communicated from first input data transceiver 211A and second input data transceiver 211B on data buses 228A-F First input data transceiver 211A is connected to avionics equipment 102 by wired communication interface 113 and data bus 221C. In some embodiments, data bus 221C is implemented as an aircraft proprietary ARINC 429 data bus to complement wired communication interface 113. In other embodiments, data bus 221C is implemented as an aircraft proprietary ARINC 717 data bus to complement wired communication interface 113. In yet another embodiment, data bus 221C is implemented as an Ethernet data bus to complement wired communication interface 113. In still another embodiment, data bus 221C is implemented as analog discrete signals to complement wired communication interface 113. In some embodiments, components of avionics equipment 102 share one or more types of wired communication interface 113 implementations. In some embodiments, components of avionics equipment 102 include a flight management computer, a display processor computer, a proximity sensor electronics unit, a flight data acquisition unit, and an on-board network system. In other embodiments, fewer or more aircraft units are included in avionics equipment 102.

In some embodiments, second input data transceiver 211B is connected to non-avionics equipment 104 (e.g., passenger Wi-Fi on/offboard connectivity system) by Ethernet interface 115 and data bus 221D implemented as an Ethernet data bus to complement Ethernet interface 115. In some embodiments, various components of non-avionics equipment 104 share Ethernet interface 115. In some embodiments, non-avionics equipment 104 includes components of a passenger information and entertainment system including an on-board Wi-Fi network 105A-D (see FIG. 1) to provide broadband internet connectivity for passenger personal electronic devices (e.g., smartphones, tablets, laptop computers, etc.) through broadband Ku/Ka band SATCOM antenna 109, for example.

The AID 100 provides the ability for a secure data connection to aircraft information systems (e.g., as part of avionics equipment 102), while also being able to provide a broadband internet connection via non-avionics equipment 104 over a common data communication path. This is due to domain switch 223, which provides physical power isolation for avionics equipment 102 and non-avionics equipment 104, where avionics equipment 102 and non-avionics equipment 104 are not powered on at the same time. For example, when domain switch 223 is controlled to power-on first input data transceiver 211A, first input data transceiver 211A communicates with avionics equipment 102 to securely receive aircraft control and aircraft information data. First input data transceiver 211A provides aircraft control and aircraft information data to controller 201 over data bus 228A.

In some embodiments, controller 201 is implemented to provide a data communication path between powered first input data transceiver 211A and wireless data transceiver 213 over data buses 228A and 228C. In other embodiments, controller is implemented to provide a data communication path between powered first input data transceiver 211A and USB controller 231 over data buses 228A and 228E.

In some embodiments, when domain switch 223 is controlled to power on second input data transceiver 211B, second input data transceiver 211B communicates with non-avionics equipment 104 to receive passenger information and entertainment data. Second input data transceiver 211B provides passenger information and entertainment data to controller 201 over data bus 228B.

In some embodiments, controller 201 is implemented to provide a data communication path between powered second input data transceiver 211B and wireless data transceiver 213 over data buses 228B and 228C. In other embodiments, controller is implemented to provide a data communication path between powered second input data transceiver 211B and USB controller 231 over data buses 228B and 228E.

Aircraft control and aircraft information data is physically isolated on data communication path 228A/228C and 228A/228E when first input data transceiver 211A device is powered on and second input data transceiver 211B is unpowered. In addition, broadband internet access and/or passenger information and entertainment data is physically isolated on data communication path 228B/228C and 228B/228E when second input data transceiver 211B is powered on and first input data transceiver 211A is unpowered. In some embodiments, controller 201 is configured to identify the selectively powered input data transceiver 211A/211B and communicate the identification to the personal electronic device 203 (e.g., external communication device).

The controller 201, as discussed previously, may be a MAC or baseband processor. The controller 201 may comprise one or more processors and a computer-readable medium. In this disclose, the controller 201, as an example, may comprise at least one processor configured to run one or more virtual machines, where a first virtual machine is configured to process the data from the avionics equipment and another virtual machine is configured to process the data from the non-avionics equipment. Moreover, the controller 201 may include a processor having multiple central processing unit (CPU) cores and utilize a microprocessor hyper threading (i.e., a hypervisor) to assign one or more CPU cores to handle data from one aircraft domain and another set of CPU cores to handle data from another aircraft data domain. It is appreciated by those of ordinary skill in the art that a hypervisor is computer software, firmware, or hardware that creates and runs virtual machines on a processor where the processor (also generally referred to as a computer) running the hypervisor is generally referred to as a host machine. In general, if utilized, the hypervisor helps implement a security solution that allows the simultaneous crossover of domains to allow for the reception of avionics data while also maintaining a broadband Internet connection. As an example, this is done by segregating the crossover in multi-layered ways with the combination of the hypervisor to separate the processor cores and limit what the processor cores are allowed to process such as, for example, VPNs, firewalls, software containerization, transport proxies, and TPMs. It is appreciated by those of ordinary skill that, in this disclosure, the AID 100 may either utilize (1) a physical hard switch to switch between the avionics domain and the offboard connectivity connection or (2) a hypervisor or software containerization approach.

In another example, the controller 201 may utilize software containerization to perform the same process as performed by the hypervisor with the use of the hypervisor since, as appreciated by those of ordinary skill in the art, software containerization is an alternative or companion to machine virtualization that involves encapsulating or packaging up software code and all its dependencies so that it can run uniformly and consistently on any infrastructure. As such, the software code may be stored as software instructions on the computer-readable medium that may be executed by at least one processor of the controller 201.

In this disclosure, the controller 201 may be further configured to enable the external communication device 203 to communicate data to the avionics equipment 102 via the data communication path when the first data interface device 211A is powered, and enable the avionics equipment 102 to communicate flight information to the external communication device 203 via the data communication path when the first data interface device 211A is powered.

In this example, controller 201 may be configured to enable two-way communication between the external communication device 203 and, for example, a flight management system (FMS) and/or electronic engine controllers (EECs). As is appreciated by those of ordinary skill in the art, the FMS is component of modern aircraft's avionics equipment 102, where the FMS is a specialized computer system that automates a wide variety of in-flight tasks, reducing the workload on the flight crew. The FMS is generally a dual system that includes a flight management computer (FMC), CDU, and a cross talk bus. The AID 100 (via the controller 201) provides a two-way control interface between the FMS and the personal electronic device 203. As such, pilots may use their live weather, traffic and route data from the AID 100 that is sent to their tablet (i.e., personal electronic device 203) applications to re-route the aircraft 101 when needed by sending updated flight plans from their personal electronic device 203 through the AID 100 to the FMS. Similarly, the AID 100 provides for a two-way control interface with the EECs.

Furthermore, the controller 201 may be configured to enable a hosted application on the external communication device 203 to communicate data to the avionics equipment 102. Moreover, the controller 201 may be configured to host applications where the hosted application on the controller 201 may be enabled to communicate data to the external communication device 203.

As another example, controller 201 may comprise a trusted platform module (TPM) configured to secure the AID 100 through integrated cryptographic keys. In this example, the TPM provides a random number generator, modules for secure generation of cryptographic key for limited use, remote attestation by creating a nearly unforgeable hash key summary of the hardware and software configuration, binding that encrypts the data using the TPM bind key and a unique RSA key descended from a storage key, and sealing.

In one embodiment, wireless data transceiver 213 is implemented with a secure Wi-Fi wireless network interface 213A to communicate between the AID 100 and flight crew personal electronic device 203. However, other secure wireless communication network interfaces are possible, such as a secure near-field wireless communication protocol 213B and/or a secure Bluetooth wireless communication protocol 213C, or other secure wireless communication interfaces. In one embodiment, flight crew personal electronic device 203 is a wireless smart device, such as a tablet computer, a cellular device or other portable smart device capable of secure wireless communication. The AID 100 includes a dedicated and secure IEEE 802.11 service set identifier for airline proprietary login for flight crew use only.

In one embodiment, USB controller 231 provides for a wired USB interface between the controller 201 and the personal electronic device 203. For example, USB controller 231 is connected to controller 201 via data bus 228E and to personal electronic device 203 at a USB communication adapter port 239 (e.g., a wired data communication port). Personal electronic device 203 includes a universal serial bus interface adapter (e.g., a wired communication adapter) to connect to adapter port 239. In this regard, personal electronic device 203 communicates with data transceiver 211A and/or data transceiver 211B over a wired data communication path including controller 201 and USB controller 231. In some embodiments, USB controller 231 includes an electrical charging adapter to electrically charge personal electronic device 203 when connected to adapter port 239. The USB communication interface discussed herein presents one non-limiting embodiment of a wired data communication interface, and it is understood other wired data communication interfaces between personal electronic device 203 and the AID 100 may be contemplated such as, for example, an Ethernet communication interface. In this example, the power module 217 may provide power to the data transceiver 211A and/or the data transceiver 211B, and personal electronic device 203 with the Ethernet communication interface utilizing power of Ethernet (PoE) that is configured to send power and data over the same conductive wire(s). Utilizing PoE, as an example, the power and data may be provided to the personal electronic device 203 used in the flight deck, so that pilots may both charge their personal electronic device 203 and access data from the AID 100 simultaneously. In this example, the use of PoE allows for higher power and longer line lengths than power of USB, without adding additional wire lines.

In one embodiment, the AID 100 includes secure digital (SD) card controller 232 to provide for a secure digital (SD) card 235 (e.g., secure data memory card) interface. SD card controller 232 provides for a data communication between flight crew personal electronic device 203 and SD card 235. In this regard, SD card controller 232 provides a communication interface to transmit and/or receive data between personal electronic device 203 and SD card 235.

In one embodiment, cellular transceiver 215 provides for a secure wireless communication interface between personal electronic device 203 and a cellular communication tower 237. In some embodiments, cellular transceiver 215 includes a subscriber identification module (SIM) 241 to securely store personal electronic device 203 subscriber identity. In this regard, cellular transceiver 215 provides a second secure wireless network 119 for secure communication between personal electronic device 203 and external cellular device 237A. In various embodiments, avionics equipment 102 provides a discrete signal to cellular transceiver 215 to disable communication between personal electronic device 203 and external cellular device 237A when aircraft 101 is airborne. This discrete signal may include, for example, "airplane on the ground," "engines running," "parking brake set," etc., in addition to hardline discrete signals from the AID 100.

It is appreciated by those of ordinary skill in the art that the circuits, components, modules, and/or devices of, or associated with, the AID 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats, without passing through a direct electromagnetic connection.

Figure 3:
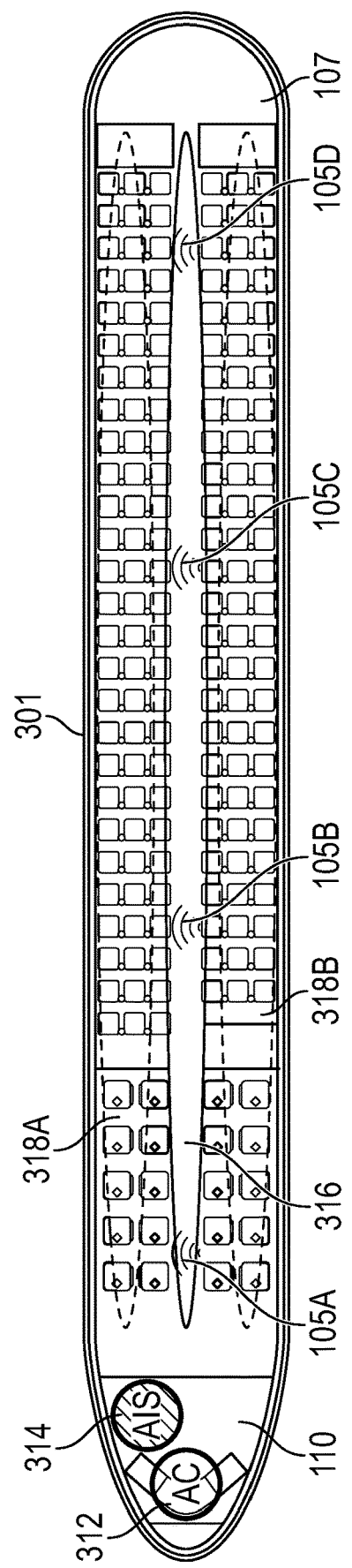
FIG. 3 illustrates various data domains within an aircraft fuselage in accordance with an embodiment of the disclosure.

FIG. 3 illustrates various data domains within an aircraft fuselage 301 in accordance with an embodiment of the disclosure. As illustrated in FIG. 3, aircraft fuselage 301 includes multiple aircraft data domains. For example, in some embodiments, fuselage 301 includes an aircraft control domain 312, an aircraft information systems domain 314, a passenger information and entertainment system domain 316, and a passenger owned devices domain 318A-B.

In various embodiments, aircraft regulations require separation of direct access between one or more of the above domains. For example, aircraft control domain 312 and aircraft information systems domain 314 require direct Ethernet connections be isolated from passenger information and entertainment system domain 316 and passenger owned devices domain 318A-B. In various embodiments, the AID 100 provides flight crew members dedicated and secure wireless access to one or more of these domains in flight deck 110 by physically isolating aircraft control domain 312 and/or aircraft information systems domain 314 from passenger information and entertainment system domain 316 and/or passenger owned devices domain 318A-B.

In some embodiments, avionics equipment 102 includes a Flight Management Computer (FMC), a Flight Data Acquisition Unit (DFDAU), a Display Process Computer (DPC), a Proximity Sensor Electronics Unit (PSEU), an Electronic Flight Bag (EFB), a Cabin Connectivity System (CCS), and an On-board Network System (ONS). The list is not exhaustive and, in other embodiments, fewer or more units may be included in avionics equipment 102. In some embodiments, non-avionics equipment 104 includes an In-Flight Entertainment and Connectivity System (IFEC) in communication with passenger owned devices domain 318 via less secure wireless access points (WAPs) 105A-D within aircraft cabin 107. The list of non-avionics equipment 104 and/or non-avionics features is not exhaustive and, in other embodiments, fewer or more units and/or features may be included.

Figure 4:
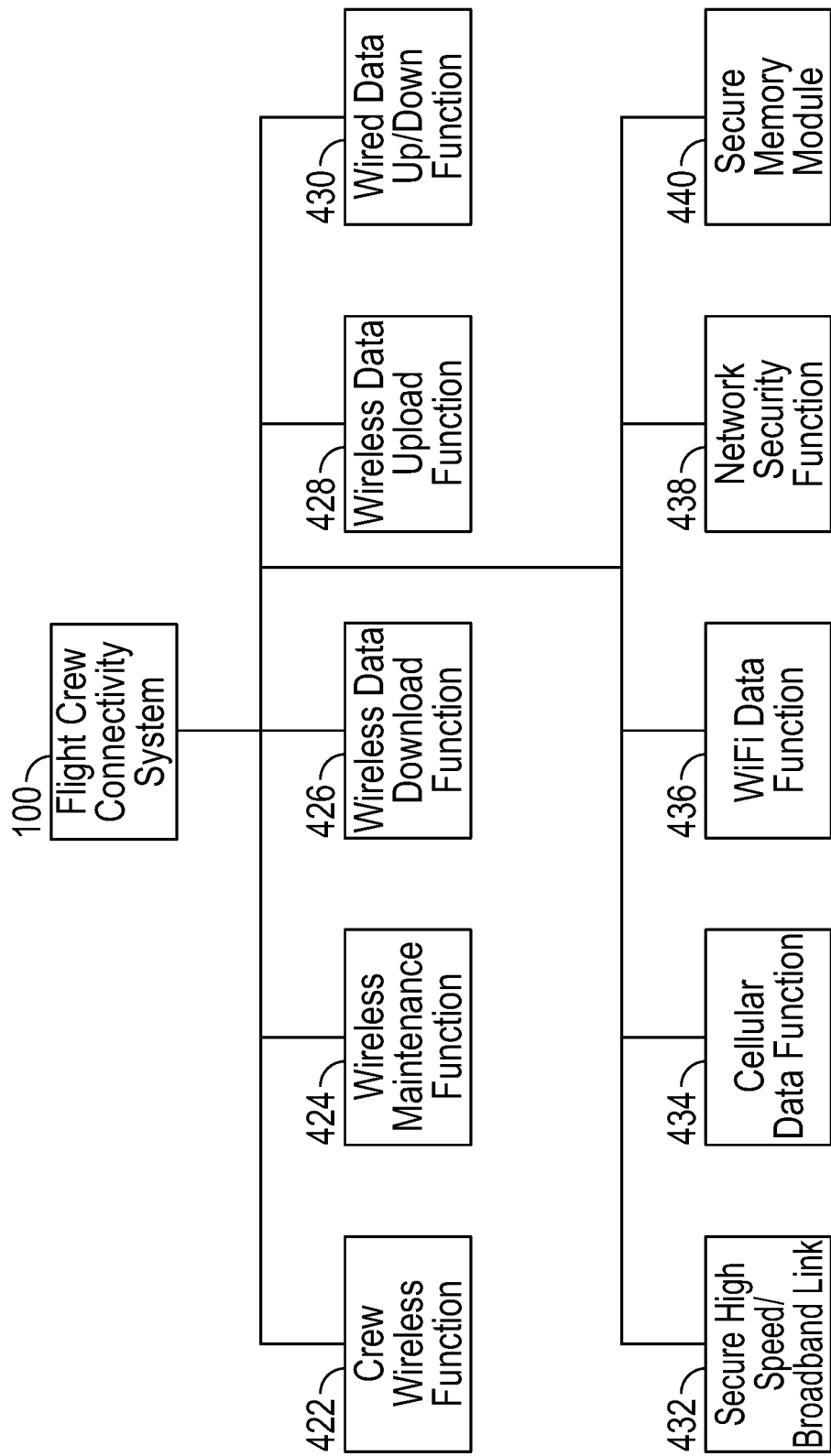
FIG. 4 illustrates various functions of a flight crew connectivity system in accordance with embodiments of the disclosure.

FIG. 4 illustrates various functions of the AID 100 in accordance with embodiments of the disclosure. As illustrated, the AID 100 provides flight crew members with dedicated and secure wireless access to many functions included within domains 312, 314, 316, and 318 of aircraft 101.

For example, in some embodiments, a crew wireless function 422 provides for a dedicated Wi-Fi network for data access by personal electronic device 203 within aircraft 101 for flight crew use only. A wireless maintenance function 424 provides flight crew members with maintenance and troubleshooting data of aircraft systems over the flight crew dedicated Wi-Fi network 103A-C. A wireless data download function 426 provides for download of airplane and maintenance data from avionics equipment 102, such as ONS and DFDAU, to flight crew member's personal electronic device 203. In some embodiments, a wireless data upload function 428 provides for upload of flight plan information to the FMC and other data or information to various avionics equipment 102 from flight crew member's personal electronic device 203.

In some embodiments, a wired data up/down function 430 provides for a high speed wired USB connection to flight crew member's personal electronic device 203 for both upload and download tasks, and provides fast charging of personal electronic device 203 connected to adapter port 239 of USB controller 231. In some embodiments, a secure high speed/broadband link 432 provides flight crew member's personal electronic device 203 with a dedicated and secure high speed off-board link for download and upload of business and/or operational data. For example, flight crew member's personal electronic device 203 may be utilized for accessing weather data in anticipation of optimizing aircraft 101 flight route.

In some embodiments, a cellular data function 434 provides flight crew members with an alternate secure high speed off-board link for download and upload of operational and business data and loadable software, such as application software for business and flight operations loadable to personal electronic device 203. The cellular link is disabled while the aircraft is airborne to comply with regulatory agency requirements. A Wi-Fi data function 436 provides flight crew member's personal electronic device 203 with an alternate secure high speed offboard link for download and upload of business and operational data. A network security function 438 is implicit through the mutually exclusive access to aircraft control domain 312, aircraft information systems domain 314, passenger information and entertainment system domain 316 via domain switch 223. A secure memory module 440 provides for localized storage of operational data via SD card 235. Additional features may include, in some embodiments, near-field 213B and/or Bluetooth 213C wireless communication protocols used for communication between the AID 100 and personal electronic device 203.

Figure 5:
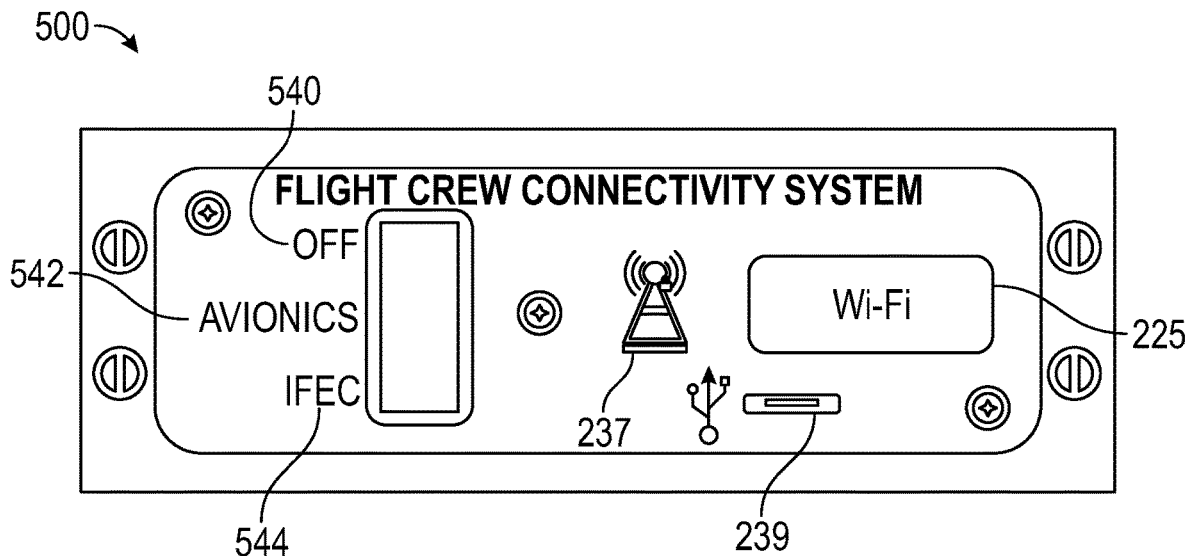
FIG. 5 illustrates a panel concept display for a flight crew connectivity system in accordance with embodiments of the disclosure.

FIG. 5 illustrates a panel concept display (or display panel) 500 for the AID 100 in accordance with embodiments of the disclosure. In some embodiments, the AID 100 is a form fit for installation in a panel within flight deck 110, for example. In this regard, the AID 100 is intended to meet criteria specific to flight deck requirements, such as: switch types, switch positions, lights, colors, font, and symbols. The AID 100 integrated control and operation are initiated via an ON/OFF switch 540 to enable or disable the system to broadcast its secure wireless signal, such as a Wi-Fi wireless signal from wireless data transceiver 213, for example. In some embodiments, display panel 500 includes an indicator light 225, implemented as a light emitting diode (LED), for visual indication that the system is turned on and transmitting. In other embodiments, indicator 225 is implemented as an audible signal or other type of indicator to inform an operator the system is turned on and transmitting. Another feature includes a multi-position switch to choose between avionics switch position 542 and IFEC switch position 544. The first switch position 540 would turn off the AID 100 to comply with regulations that may require non-flight critical devices to be turned off in the event of an emergency. Avionics switch position 542 (highest level of security), enables a link to aircraft avionics equipment 102 data, but does not allow the flight crew to access non-avionics equipment 104, such as the broadband SATCOM system. IFEC switch position 544 (lowest level of security), enables flight crew to access the IFEC for connection to broadband internet applications, and does not allow the flight crew to access avionics equipment 102.

In some embodiments, a fourth switch position is installed and is implemented by a rotary type switch, for example. The fourth switch position is used for loading aircraft control computers, such as wirelessly uploading a flight plan to the FMC from personal electronic device 203. In various embodiments, the fourth switch position is isolated from the other switch positions (e.g., switch positions 542 and/or 544) that link to avionics equipment 102 data and IFEC. In some embodiments, a USB adapter port 239 is installed with a wired data connection to provide a wired connection between the AID 100 and personal electronic device 203. In some embodiments, adapter port 239 is used to electrically charge personal electronic device 203. In some embodiments, the AID 100 includes cellular transceiver 215 including, for example, a 3G, 4G, and/or 5G cellular modem (where the cellular transceiver 215 is a 3G cellular transceiver, 4G cellular transceiver, or 5G cellular transceiver) and SIM card 241, to allow personal electronic device 203 to communicate with a cellular mobile device via cellular tower 237, when aircraft 101 is on the ground.

In this example, the SIM card 241 may be an eSIM card that provides for automatic switching by an airline between various cellular service providers based on the aircraft 101 location such that a user of the AID 100 always appears as a local user instead of a roaming user. In this example, the SIM card 241 includes cellular service data and the cellular transceiver 215 is configured to automatically switch between a plurality of cellular service providers based on a location of the aircraft 101 such that the external communication device 203 appears as a local device on a cellular network of a corresponding cellular service provider of the plurality of cellular service providers.

The wireless data transceiver 213 of the AID 100 may also be configured to utilize dynamic frequency selection (DFS) and transmit power control (TPC) based on IEEE 802.11h. In general, based on the country that the aircraft 101 is located in, there are different channels and different maximum power level at different modulations that may be utilized by the AID 100. The AID 100 may include a look up table that includes these values depending on the country that the aircraft 101 is located in.

The AID 100 also includes a method for handing off data between different access points and a cellular network. In general, the controller 201 is configured to enable communication between the wireless data transceiver and a first access point at a first terminal of a plurality of terminals at an airport, perform a handoff method when the aircraft is taxiing between the plurality of terminals, wherein each terminal includes a corresponding access point, and enable communication with the external cellular device if the aircraft is between the plurality of terminals and out of range of the corresponding access points. In general, if the AID 100 is in between terminals, it is configured to switch between Wi-Fi and a cellular network.

In addition, the handoff method may also include connecting the AID 100 to the strongest available connection as opposed to just switching between cellular or Wi-Fi connections, and the method may consider factors in determining whether to perform a handoff. As an example, the handoff method may utilize a combination of signal to noise ratio (SNR) and packet error rate (PER) to determine the appropriate time to switch from one WAP to the next, or from Wi-Fi to cellular connection, or cellular connection to Wi-Fi. Moreover, the handoff method may be configured to support multiple simultaneous links for sending data to/from one or more end points, and each connection type may be further determined by a cost-awareness method that looks at the cost per Megabyte to transfer data and the priority of each file type as defined by the quality of service (QoS) priority assigned to each file type. The handoff method may also utilize SATCOM connections.

Figure 6A:
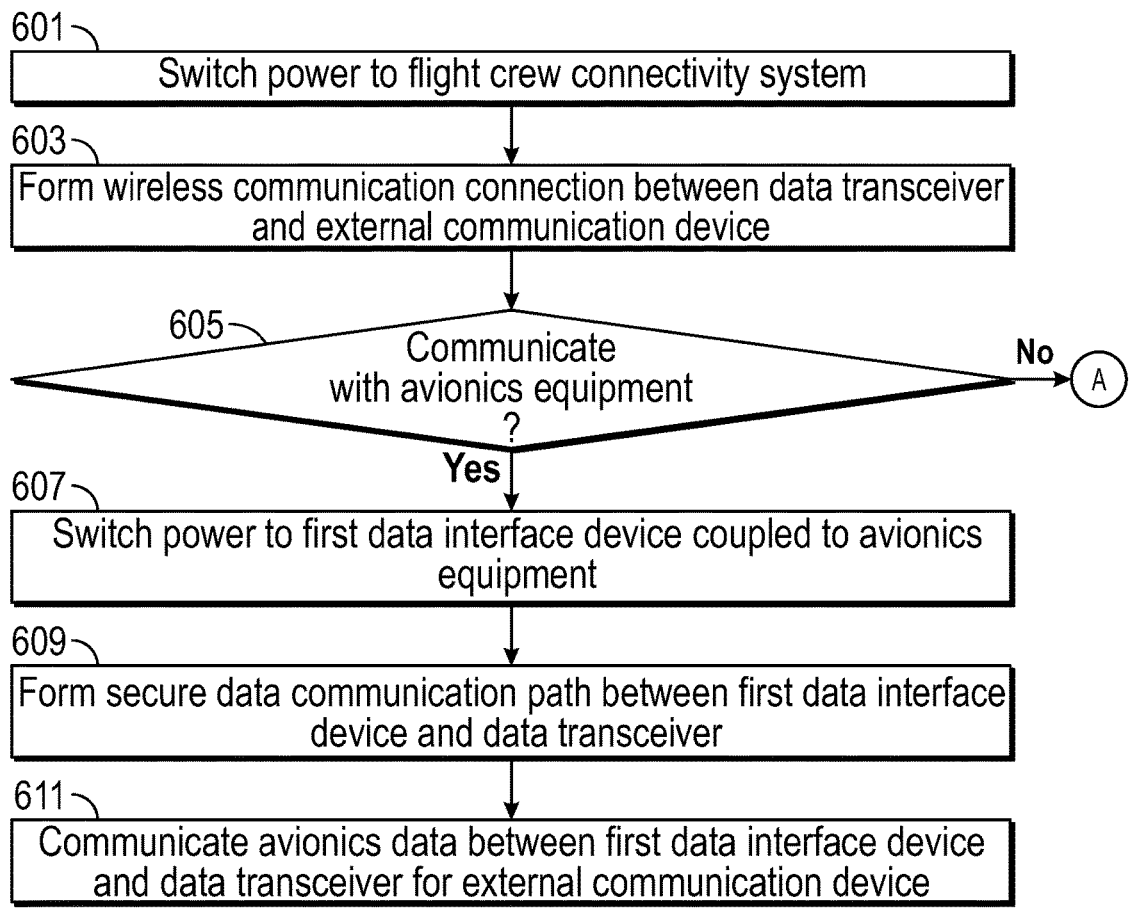
FIGS. 6A-B illustrate flow diagrams describing a method for using a flight crew connectivity system in accordance with an embodiment of the disclosure.
Figure 6B:
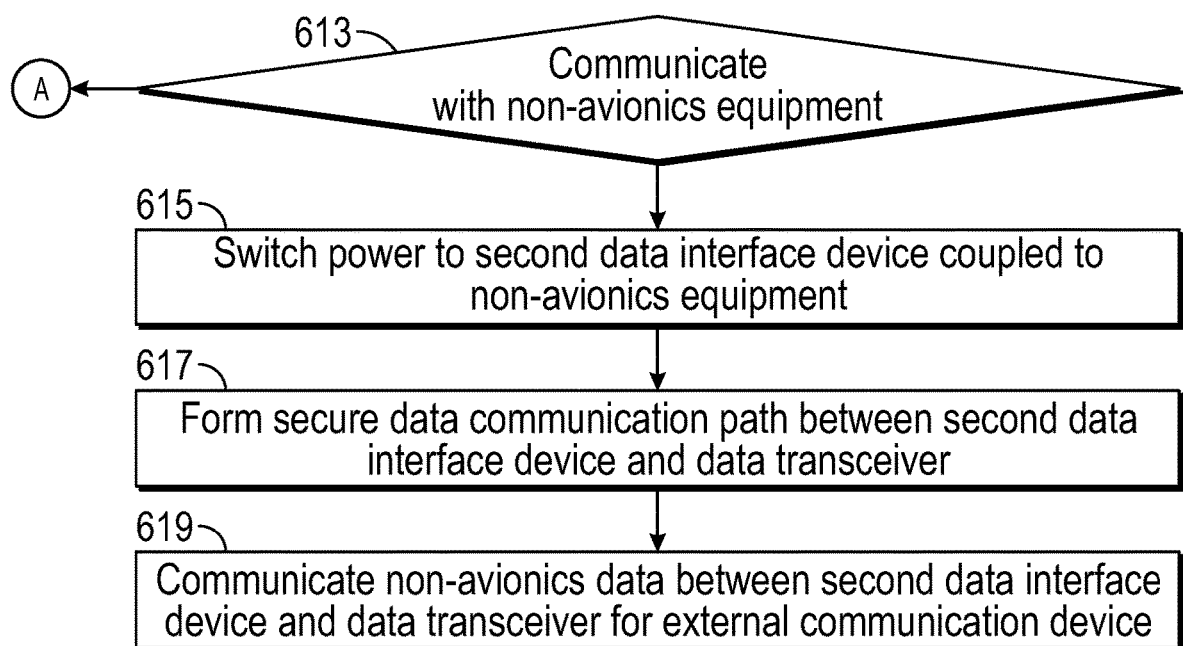

FIGS. 6A-B illustrate flow diagrams describing a method for using the AID 100 in accordance with an embodiment of the disclosure.

In block 601, the AID 100 is powered on. In this regard, switch 540 on display panel 500 is used to switch power to the AID 100. Switch 540 on display panel 500 controls power switch 219 connected between aircraft power module 106 and the AID 100 to power on and power off the AID 100.

In block 603, after powering on, the AID 100 forms a wireless communication connection between data transceiver 213 and personal electronic device 203 (e.g., external communication device). In some embodiments, a secure Wi-Fi wireless interface 213A is used as a wireless connection between the AID 100 and flight crew personal electronic device 203. However, other secure wireless communication connections are possible, such as a secure near-field wireless communication connection 213B and/or a secure Bluetooth wireless communication connection 213C. In some embodiments, the AID 100 includes a dedicated and secure IEEE 802.11 service set identifier for airline proprietary login for flight crew use only.

In block 605, flight crew member determines whether to communicate with avionics equipment 102 or non-avionics equipment 104. In this regard, flight crew member selects avionics switch position 542 on display panel 500 to communicate with avionics equipment 102 or IFEC switch position 544 to communicate with non-avionics equipment 104.

In block 607, if flight crew member chooses avionics switch position 542, domain switch 223 is moved to first output terminal 223A to switch power to first data transceiver 211A (e.g., first data interface device) in signal communication with the avionics equipment 102. Powered on data transceiver 211A receives data from avionics equipment 102 via data bus 221C implemented as an aircraft proprietary ARINC 429 data bus, an aircraft proprietary ARINC 717 data bus and/or an Ethernet interface. Data transceiver 211A may communicate with one or more units associated with avionics equipment 102, as discussed herein.

In block 609, controller 201 forms a secure data communication path between data transceiver 211A (e.g., first data interface device) and data transceiver 213 via data buses 228A and 228C. For example, domain switch 223 isolates power to data transceiver 211A only, while maintaining data transceiver 211B in an off state. Thus, communication between data transceiver 211A and avionics equipment 102 is isolated on data buses within the AID 100.

In block 611, the AID 100 provides for one or more units associated with avionics equipment 102 to securely communicate avionics data between data transceiver 211A (e.g., first data interface device) and data transceiver 213 for personal electronic device 203 (e.g., external communication device). In this regard, avionics equipment 102 is physically isolated on data buses 228A and 228C, and wireless communication connection between data transceiver 211A and personal electronic device 203 is a dedicated and secure IEEE 802.11 service set identifier (SSID) airline proprietary login for flight crew personal electronic device 203 use only.

In block 613, flight crew member selects IFEC switch position 544 on display panel 500 to communicate with non-avionics equipment 104.

In block 615, if flight crew member chooses IFEC switch position 544, domain switch 223 is moved to second output terminal 223B to switch power to data transceiver 211B (e.g., second data interface device) in signal communication with the non-avionics equipment 104. Powered on data transceiver 211B receives data from non-avionics equipment 104 via data bus 221D implemented as an Ethernet data bus to complement Ethernet interface 115.

In block 617, controller 201 forms a secure data communication path between data transceiver 211B (e.g., second data interface device) and data transceiver 213 via data buses 228B and 228C. As discussed herein, domain switch 223 isolates power to data transceiver 211B only, while maintaining data transceiver 211A in an off state. Thus, communication between data transceiver 211B and non-avionics equipment 104 is isolated on data buses within the AID 100. In this regard, security is maintained for avionics equipment 102 within the AID 100.

In block 619, the AID 100 provides for one or more units associated with non-avionics equipment 104 to securely communicate non-avionics data between data transceiver 211B (e.g., second data interface device) and data transceiver 213 for personal electronic device 203 (e.g., external communication device). In this regard, non-avionics equipment 104 is physically isolated on data buses 228B and 228C, and wireless communication connection between data transceiver 211B and personal electronic device 203 is a dedicated and secure IEEE 802.11 service set identifier (SSID) airline proprietary login for flight crew personal electronic device 203 use only. Communication with non-avionics equipment 104 provides for flight crew members to access broadband internet on their personal electronic device 203 and/or communicate with external cellular users, for example.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed:

1. An aircraft interface device (AID) configured for deployment on an aircraft, the AID comprising:
    two or more data interface devices configured to communicate data;
    an external data transceiver configured to communicate to an external communication device;
    a power module configured to provide power to the two or more data interface devices and the external data transceiver, wherein the two or more data interface devices comprise:
        a first data interface device configured to communicate with avionics equipment when the first data interface device is powered; and
        a second data interface device configured to communicate with non-avionics equipment when the second data interface device is powered;
    a domain switch in signal communication between the power module and each of the two or more data interface devices and configured to selectively provide power from the power module to at least one of the two or more data interface devices; and
    a controller in signal communication between the two or more data interface devices and the external data transceiver and configured to provide a data communication path between the selectively powered data interface device and the external data transceiver for the external communication device, wherein:

data from the avionics equipment is physically isolated on the data communication path when the first data interface device is powered and the second data interface device is unpowered; and data from the non-avionics equipment is physically isolated on the data communication path when the second data interface device is powered and the first data interface device is unpowered.

2. The AID of claim 1, wherein the avionics equipment is configured to provide the data from the avionics equipment that includes aircraft control and aircraft information data, and the non-avionics equipment is configured to provide the data from the non-avionics equipment that includes broadband Internet access and/or passenger information and entertainment data.

3. The AID of claim 2, wherein the aircraft control and aircraft information data is physically isolated on the data communication path when the first data interface device is powered and the second data interface device is unpowered, the broadband Internet access and/or the passenger information and entertainment data is physically isolated on the data communication path when the second data interface device is powered and the first data interface device is unpowered, and the controller comprises a processor that is configured to run one or more virtual machines, wherein a first virtual machine is configured to process the data from the avionics equipment and another virtual machine is configured to process the data from the non-avionics equipment.

4. The AID of claim 2, wherein the aircraft control and aircraft information data is physically isolated on the data communication path when the first data interface device is powered and the second data interface device is unpowered, the broadband Internet access and/or the passenger information and entertainment data is physically isolated on the data communication path when the second data interface device is powered and the first data interface device is unpowered, and the controller comprises a processor and a computer-readable medium, wherein the computer-readable medium is configured to store software instructions that when executed by the processor causes software containerization, and wherein the processor is configured to process the data from the avionics equipment and the data from the non-avionics equipment while physically isolating the aircraft control and aircraft information data and the broadband Internet access and/or the passenger information and entertainment data.

5. The AID of claim 2, wherein the controller is further configured to enable the external communication device to communicate data to the avionics equipment via the data communication path when the first data interface device is powered, and enable the avionics equipment to communicate flight information to the external communication device via the data communication path when the first data interface device is powered.

6. The AID of claim 5, wherein the controller is configured to enable a hosted application on the external communication device to communicate data to the avionics equipment.

7. The AID of claim 2, wherein the controller comprises a processor and a computer-readable medium, and the controller is configured to host applications.

8. The AID of claim 7, wherein the controller is configured to enable a hosted application on the controller to communicate data to the external communication device.

9. The AID of claim 7, wherein the controller comprises a trusted platform module (TPM) configured to secure the AID through integrated cryptographic keys.

10. The AID of claim 2, wherein the external data transceiver comprises a wireless data transceiver configured to provide a secure wireless communication network for the external communication device, and the wireless data transceiver is a Wi-Fi data transceiver, Bluetooth data transceiver, near-field communication (NFC) data transceiver, or Internet of Things (IoT) technology transceiver, wherein the IoT transceiver comprises an IoT protocol utilizing IEEE 802.15.4.

11. The AID of claim 10, wherein the secure wireless communication network is a virtual private network (VPN) configured to communicate with one or more communication end points.

12. The AID of claim 10, wherein the external communication device comprises one or more wireless smart devices configured to communicate with the wireless data transceiver via the secure wireless communication network.

13. The AID of claim 12, further comprising a cellular transceiver comprising a second secure wireless communication network configured to communicate between the one or more wireless smart devices and an external cellular device, wherein the second secure wireless communication network is configured to communicate application software comprising business and/or flight operations to the one or more wireless smart devices and/or the avionics equipment.

14. The AID of claim 13, wherein the cellular transceiver comprises a 3G cellular transceiver, 4G cellular transceiver, or 5G cellular transceiver.

15. The AID of claim 14, wherein the cellular transceiver includes a subscriber identification module (SIM) configured to securely store a subscriber identity of a user of the external communication device.

16. The AID of claim 15, wherein the SIM includes cellular service data, and wherein the cellular transceiver is configured to automatically switch between a plurality of cellular service providers based on a location of the aircraft such that the external communication device appears as a local device on a cellular network of a corresponding cellular service provider of the plurality of cellular service providers.

17. The AID of claim 13, wherein the controller is configured to enable communication between the wireless data transceiver and a first access point at a first terminal of a plurality of terminals at an airport, perform a handoff method when the aircraft is taxiing between the plurality of terminals, wherein each terminal includes a corresponding access point, and enable communication with the external cellular device if the aircraft is between the plurality of terminals and out of range of the corresponding access points.

18. The AID of claim 10, wherein the wireless data transceiver is configured to utilize dynamic frequency selection (DFS) and transmit power control (TPC) based on IEEE 802.11h.

19. The AID of claim 1, wherein the power module is configured to provide power to the two or more data interface devices and/or the external data transceiver via an Ethernet connection.

20. An aircraft comprising:
avionics equipment comprising a flight management system (FMS) and electronic engine controllers (EECs);
non-avionics equipment;
an aircraft interface device (AID) comprising:
two or more data interface devices configured to communicate data;
an external data transceiver configured to communicate to an external communication device;
a power module configured to provide power to the two or more data interface devices and the external data transceiver, wherein the two or more data interface devices comprise:
a first data interface device configured to communicate with the avionics equipment when the first data interface device is powered; and
a second data interface device configured to communicate with the non-avionics equipment when the second data interface device is powered;
a domain switch in signal communication between the power module and each of the two or more data interface devices and configured to selectively provide power from the power module to at least one of the two or more data interface devices; and
a controller in signal communication between the two or more data interface devices and the external data transceiver and configured to provide a data communication path between the selectively powered data interface device and the external data transceiver for the external communication device, wherein:
data from the avionics equipment is physically isolated on the data communication path when the first data interface device is powered and the second data interface device is unpowered; and
data from the non-avionics equipment is physically isolated on the data communication path when the second data interface device is powered and the first data interface device is unpowered;
a power source configured to provide power; and
a power source switch coupled between the power source and the power module configured to selectively switch power from the power source to the power module.

21. The aircraft of claim 20, wherein the controller is configured to enable two-way communication between the external communication device and the FMS and EECs.

* * * * *